US011550747B2

(12) United States Patent
Strickler et al.

(10) Patent No.: US 11,550,747 B2
(45) Date of Patent: *Jan. 10, 2023

(54) COMPOSITE INTERFACE CIRCUIT

(71) Applicant: Ecosense Lighting Inc., Los Angeles, CA (US)

(72) Inventors: Chris Strickler, Mission Viejo, CA (US); Mustafa Homsi, Los Angeles, CA (US)

(73) Assignee: KORRUS, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,908

(22) Filed: Sep. 8, 2021

(65) Prior Publication Data

US 2022/0138139 A1    May 5, 2022

Related U.S. Application Data

(63) Continuation of application No. 16/686,039, filed on Nov. 15, 2019, now Pat. No. 11,144,493, which is a continuation-in-part of application No. 16/401,985, filed on May 2, 2019, now abandoned.

(60) Provisional application No. 62/667,571, filed on May 6, 2018, provisional application No. 62/666,063, filed on May 2, 2018.

(51) Int. Cl.
*G06F 13/40* (2006.01)
*G06F 13/38* (2006.01)
*G06F 13/10* (2006.01)

(52) U.S. Cl.
CPC ........ *G06F 13/4077* (2013.01); *G06F 13/385* (2013.01); *G06F 13/105* (2013.01)

(58) Field of Classification Search
CPC ...... H03F 3/45; H03K 17/691; H03K 17/567; H04N 5/357
See application file for complete search history.

(56) References Cited

U.S. PATENT DOCUMENTS

| | | | |
|---|---|---|---|
| 6,324,028 B1 * | 11/2001 | Ramalho | H03K 17/662 360/68 |
| 2005/0185665 A1 * | 8/2005 | Uboldi | H04L 5/1423 370/458 |
| 2009/0225206 A1 * | 9/2009 | Oike | H04N 5/374 327/333 |

(Continued)

*Primary Examiner* — Getente A Yimer
(74) *Attorney, Agent, or Firm* — Jay M. Brown

(57) ABSTRACT

Composite interface circuit including bidirectional single-conductor bus, first switching circuit, and second switching circuit. Bidirectional single-conductor bus is coupled by first pull-up resistor (R1) with first direct current ("DC") input current source having first voltage (V1). First switching circuit includes first transistor (T1) being coupled with first pull-up resistor (R1) and with bidirectional single-conductor bus. Second switching circuit includes second transistor (T2) being coupled by second pull-up resistor (R2) with second DC input current source having second voltage (V2). Second switching circuit further includes voltage divider coupling second transistor (T2) with bidirectional single-conductor bus. First and second switching circuits are respectfully configured for being coupled with first transmitter conductor (Tx1) and first receiver conductor (Rx1) of full duplex universal asynchronous data communication interface.

20 Claims, 1 Drawing Sheet

(56) References Cited

U.S. PATENT DOCUMENTS

2011/0304399 A1* 12/2011 Kikuchi .............. H04L 25/0282
330/296
2016/0335221 A1* 11/2016 Zhu ........................ G06F 13/36

\* cited by examiner

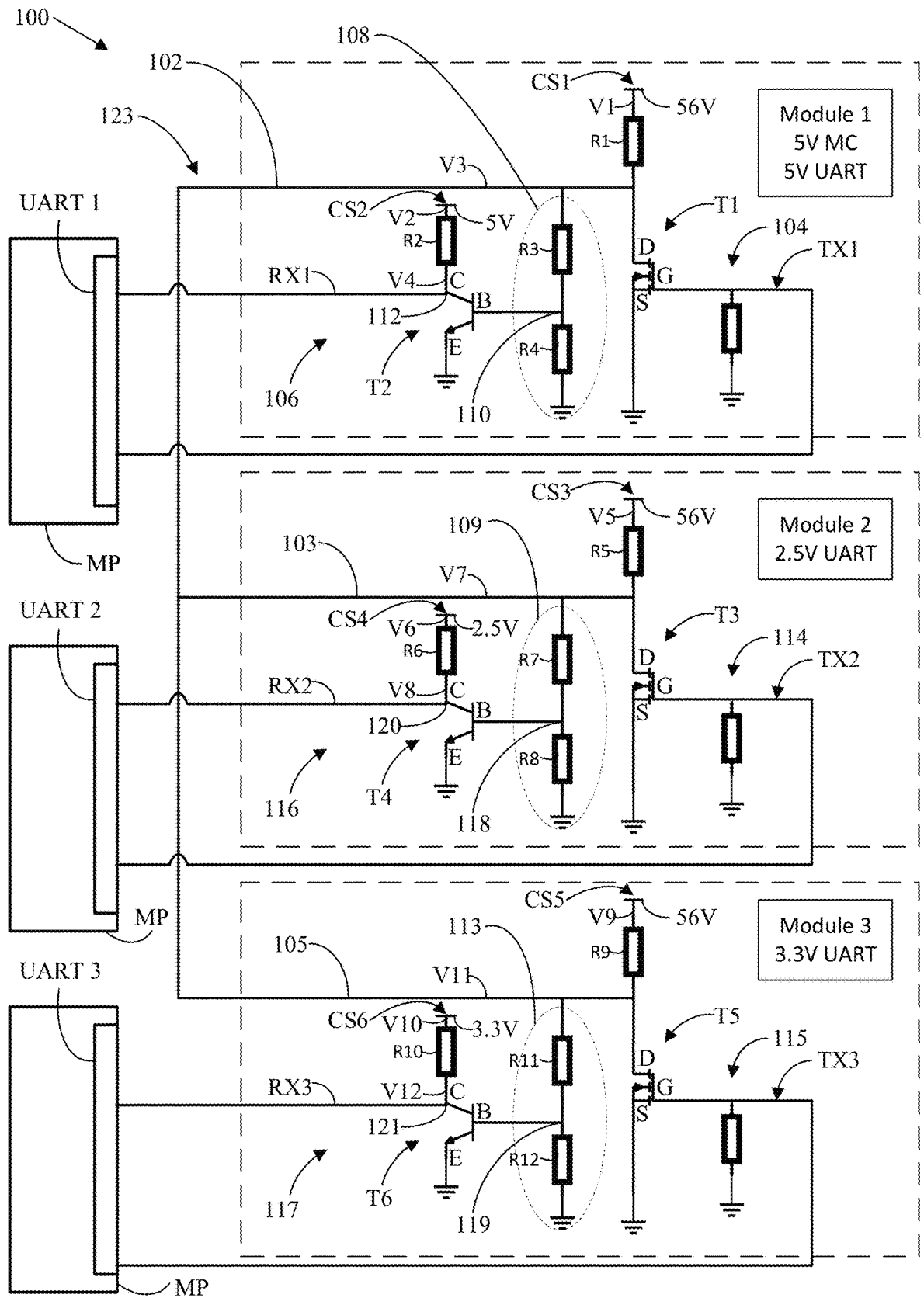

COMPOSITE INTERFACE CIRCUIT

CROSS-REFERENCE TO RELATED APPLICATION

This non-provisional U.S. patent application is a continuation of commonly-owned non-provisional U.S. patent application Ser. No. 16/686,039 filed on Nov. 15, 2019 entitled "COMPOSITE INTERFACE CIRCUIT", which is a continuation-in-part of commonly-owned non-provisional U.S. patent application Ser. No. 16/401,985 filed on May 2, 2019 entitled "ECOART SYSTEM", which claims the benefit of commonly-owned provisional U.S. patent application Ser. No. 62/667,571, filed on May 6, 2018 entitled "ECOART2", and which further claims the benefit of commonly-owned provisional U.S. patent application Ser. No. 62/666,063, filed on May 2, 2018 entitled "ECOART". The entireties of all of the foregoing U.S. patent applications (Ser. No. 16/686,039, and Ser. No. 16/401,985, and Ser. No. 62/667,571, and Ser. No. 62/666,063) are hereby incorporated herein by reference.

BACKGROUND OF THE INVENTION

Field of the Invention

The present invention relates to the field of universal asynchronous receiver/transmitter circuits.

Background of the Invention

Numerous universal asynchronous receiver/transmitter circuits have been developed for providing data communications. Despite the existence of these universal asynchronous receiver/transmitter circuits, further improvements are still needed in universal asynchronous receiver/transmitter circuits.

SUMMARY

In an example of an implementation, a composite interface circuit is provided, including a bidirectional single-conductor bus, a first switching circuit, and a second switching circuit. The composite interface circuit is for coupling together: (a) a first full duplex universal asynchronous data communication interface having a first receiver conductor (Rx1) and a first transmitter conductor (Tx1); and (b) a second full duplex universal asynchronous data communication interface having a second receiver conductor (Rx2) and a second transmitter conductor (Tx2). In the example of the composite interface circuit, the bidirectional single-conductor bus is coupled by a first pull-up resistor (R1) with a first direct current ("DC") input current source having a first voltage (V1). The first switching circuit in the example of the composite interface circuit includes a first transistor (T1), the first transistor (T1) being coupled with the first pull-up resistor (R1) and with the bidirectional single-conductor bus. Further in the example of the composite interface circuit, the second switching circuit includes a second transistor (T2), the second transistor (T2) being coupled by a second pull-up resistor (R2) with a second DC input current source having a second voltage (V2), the second switching circuit further including a voltage divider coupling the second transistor (T2) with the bidirectional single-conductor bus. In the example of the composite interface circuit, the first switching circuit is configured for being coupled with a first transmitter conductor (Tx1), and the second switching circuit is configured for being coupled with a first receiver conductor (Rx1).

In some examples of the composite interface circuit, the voltage divider may include a third resistor (R3) and a fourth resistor (R4), and the third resistor (R3) may be coupled between the fourth resistor (R4) and the bidirectional single-conductor bus, and the second transistor (T2) may be coupled with the voltage divider at a first node between the third resistor (R3) and the fourth resistor (R4).

In further examples of the composite interface circuit, the voltage divider may include the third resistor (R3) and the fourth resistor (R4) as being selected for reducing the first voltage (V1), at the first node, below a breakdown voltage of the second transistor (T2).

In additional examples of the composite interface circuit, the first voltage (V1) may be substantially higher than the second voltage (V2).

In other examples of the composite interface circuit, the voltage divider may include the third resistor (R3) and the fourth resistor (R4) as being selected for reducing the first voltage (V1), at the first node, below a breakdown voltage of the second transistor (T2).

In some examples of the composite interface circuit, the first voltage (V1) may be at least about one order of magnitude higher than the second voltage (V2).

In further examples of the composite interface circuit, the first voltage (V1) may be selected as being substantially higher than the second voltage (V2), and the first pull-up resistor (R1) may be selected for causing the bidirectional single-conductor bus to be pulled up to a third voltage (V3) being substantially higher than the second voltage (V2) so as to substantially increase a rate of rise of a parasitic capacitance of the first transistor (T1).

In additional examples of the composite interface circuit, the first transistor (T1) may have a first switching voltage threshold; and the third voltage (V3) of the bidirectional single-conductor bus may be pulled down to zero volts when a voltage on the first transmitter conductor (Tx1) exceeds the first switching voltage threshold.

In other examples of the composite interface circuit, the first voltage (V1) may be selected as being substantially higher than the second voltage (V2), and the third resistor (R3) and the fourth resistor (R4) may be selected for causing the first voltage (V1) to be sufficiently divided at the first node so as to substantially increase a rate of rise of a parasitic capacitance of the second transistor (T2) at the first node.

In some examples of the composite interface circuit, the second transistor (T2) may have a second switching voltage threshold; and the third voltage (V3) of the bidirectional single-conductor bus may cause a fourth voltage (V4) at a second node between the second transistor (T2) and the second resistor (R2) to be pulled down to zero volts when a voltage at the first node exceeds the second switching voltage threshold.

In further examples of the composite interface circuit, the first transistor (T1) may be a field-effect transistor having a gate, a source, and a drain; and the gate may be configured for being coupled with a first transmitter conductor (Tx1); and the first pull-up resistor (R1) may be coupled between the drain and the first DC input current source.

In other examples of the composite interface circuit, the first transistor (T1) may be an N-channel enhancement-mode metal-oxide semiconductor field-effect transistor ("MOSFET") having a gate, a source, and a drain; and the gate may be configured for being coupled with a first transmitter conductor (Tx1); and the first pull-up resistor (R1) may be coupled between the drain and the first DC input current source.

In some examples of the composite interface circuit, the first transistor (T1) may be a bipolar junction transistor ("BJT") having a base, an emitter, and a collector; and the base may be configured for being coupled with a first transmitter conductor (Tx1); and the first pull-up resistor (R1) may be coupled between the collector and the first DC input current source.

In further examples of the composite interface circuit, the first transistor (T1) may be an N-channel bipolar junction transistor ("BJT") having a base, an emitter, and a collector; and the base may be configured for being coupled with a first transmitter conductor (Tx1); and the first pull-up resistor (R1) may be coupled between the collector and the first DC input current source.

In additional examples of the composite interface circuit, the second transistor (T2) may be a field-effect transistor having a gate, a source, and a drain; and the gate may be configured for being coupled with the voltage divider at the first node between the third resistor (R3) and the fourth resistor (R4); and the second pull-up resistor (R2) may be coupled between the drain and the second DC input current source.

In other examples of the composite interface circuit, the second transistor (T2) may be an N-channel enhancement-mode metal-oxide semiconductor field-effect transistor ("MOSFET") having a gate, a source, and a drain; and the gate may be configured for being coupled with the voltage divider at the first node between the third resistor (R3) and the fourth resistor (R4); and the second pull-up resistor (R2) may be coupled between the drain and the second DC input current source.

In some examples of the composite interface circuit, the second transistor (T2) may be a bipolar junction transistor ("BJT") having a base, an emitter, and a collector; and the gate may be configured for being coupled with the voltage divider at the first node between the third resistor (R3) and the fourth resistor (R4); and the second pull-up resistor (R2) may be coupled between the collector and the second DC input current source.

In further examples of the composite interface circuit, the second transistor (T2) may be an N-channel bipolar junction transistor ("BJT") having a base, an emitter, and a collector; and the base may be configured for being coupled with the voltage divider at the first node between the third resistor (R3) and the fourth resistor (R4); and the second pull-up resistor (R2) may be coupled between the collector and the second DC input current source.

In additional examples of the composite interface circuit, the bidirectional single-conductor bus and the first switching circuit and the second switching circuit may be incorporated into an integrated circuit.

In other examples of the composite interface circuit, the integrated circuit may be in the form of a microcontroller, an application-specific integrated circuit (ASIC), a digital signal processor (DSP), or a field-programmable gate array (FPGA).

In some examples, the composite interface circuit may further include a first full duplex universal asynchronous data communication interface having a first receiver conductor (Rx1) and a first transmitter conductor (Tx1), and the first switching circuit may be coupled with the first transmitter conductor (Tx1), and the second switching circuit may be coupled with the first receiver conductor (Rx1).

In further examples of the composite interface circuit, the first full duplex universal asynchronous data communication interface may be included in a microprocessor being incorporated in an active device.

In additional examples of the composite interface circuit, the first full duplex universal asynchronous data communication interface may be included in a microprocessor being incorporated in a lighting device.

In other examples of the composite interface circuit, the first full duplex universal asynchronous data communication interface may exchange bidirectional data communications with the microprocessor for controlling the lighting device.

In some examples of the composite interface circuit, the first full duplex universal asynchronous data communication interface may exchange bidirectional data communications with the microprocessor for controlling a lighting device that includes a semiconductor light-emitting device.

In further examples, the composite interface circuit may include another bidirectional single-conductor bus, and a third switching circuit, and a fourth switching circuit. In those examples, the composite interface circuit may include a fifth pull-up resistor (R5) being coupled between the third switching circuit and a third direct current ("DC") input current source having a fifth voltage (V5). Also in those examples of the composite interface circuit, the third switching circuit may include a third transistor (T3), the third transistor (T3) being coupled with the fifth pull-up resistor (R5) and with the another bidirectional single-conductor bus. Further in those examples of the composite interface circuit, the fourth switching circuit may include a fourth transistor (T4), and the fourth transistor (T4) may be coupled by a sixth pull-up resistor (R6) with a fourth DC input current source having a sixth voltage (V6), and the fourth switching circuit may further include another voltage divider coupling the fourth transistor (T4) with the bidirectional single-conductor bus. In those examples of the composite interface circuit, the third switching circuit may be configured for being coupled with a second transmitter conductor (Tx2); and the fourth switching circuit may be configured for being coupled with a second receiver conductor (Rx2).

In some examples of the composite interface circuit, the another voltage divider may include a seventh resistor (R7) and an eighth resistor (R8), and the seventh resistor (R7) may be coupled between the eighth resistor (R8) and the bidirectional single-conductor bus, and the fourth transistor (T4) may be coupled with the another voltage divider at a third node between the seventh resistor (R7) and the eighth resistor (R8).

In further examples of the composite interface circuit, the another voltage divider may include the seventh resistor (R7) and the eighth resistor (R8) as being selected for reducing the fifth voltage (V5), at the third node, below a breakdown voltage of the fourth transistor (T4).

In additional examples of the composite interface circuit, the fifth voltage (V5) may be substantially higher than the sixth voltage (V6).

In other examples of the composite interface circuit, the another voltage divider may include the seventh resistor (R7) and the eighth resistor (R8) as being selected for reducing the fifth voltage (V5), at the third node, below a breakdown voltage of the fourth transistor (T4).

In some examples of the composite interface circuit, the fifth voltage (V5) may be at least about one order of magnitude higher than the sixth voltage (V6).

In further examples of the composite interface circuit, the fifth voltage (V5) may be selected as being substantially higher than the sixth voltage (V6), and the fifth pull-up resistor (R5) may be selected for causing the bidirectional single-conductor bus to be pulled up to a seventh voltage (V7) being substantially higher than the sixth voltage (V6) so as to substantially increase a rate of rise of a parasitic capacitance of the third transistor (T3).

In additional examples of the composite interface circuit, the third transistor (T3) may have a third switching voltage threshold; and the seventh voltage (V7) of the bidirectional single-conductor bus may be pulled down to zero volts when a voltage on the second transmitter conductor (Tx2) exceeds the third switching voltage threshold.

In other examples of the composite interface circuit, the fifth voltage (V5) may be selected as being substantially higher than the sixth voltage (V6), and the seventh resistor (R7) and the eighth resistor (R8) may be selected for causing the fifth voltage (V5) to be sufficiently divided at the third node so as to substantially increase a rate of rise of a parasitic capacitance of the fourth transistor (T4) at the third node.

In some examples of the composite interface circuit, the fourth transistor (T4) may have a fourth switching voltage threshold; and the seventh voltage (V7) of the bidirectional single-conductor bus may cause an eighth voltage (V8) at a fourth node between the fourth transistor (T4) and the second resistor (R2) to be pulled down to zero volts when a voltage at the third node exceeds the fourth switching voltage threshold.

In further examples of the composite interface circuit, the second voltage (V2) may be selected independently of selecting the sixth voltage (V6), and the third resistor (R3) and the fourth resistor (R4) may be selected for causing the first voltage (V1) to be sufficiently divided at the first node so as to substantially increase a rate of rise of a parasitic capacitance of the second transistor (T2) at the first node, and the seventh resistor (R7) and the eighth resistor (R8) may be selected for causing the fifth voltage (V5) to be sufficiently divided at the third node so as to substantially increase a rate of rise of a parasitic capacitance of the fourth transistor (T4) at the third node.

In additional examples of the composite interface circuit, the third transistor (T3) may be a field-effect transistor having a gate, a source, and a drain; and the gate may be configured for being coupled with a second transmitter conductor (Tx2); and the fifth pull-up resistor (R5) may be coupled between the drain and the third DC input current source.

In other examples of the composite interface circuit, the third transistor (T3) may be an N-channel enhancement-mode metal-oxide semiconductor field-effect transistor ("MOSFET") having a gate, a source, and a drain; and the gate may be configured for being coupled with a second transmitter conductor (Tx2); and the fifth pull-up resistor (R5) may be coupled between the drain and the third DC input current source.

In some examples of the composite interface circuit, the third transistor (T3) may be a bipolar junction transistor ("BJT") having a base, an emitter, and a collector; and the base may be configured for being coupled with a second transmitter conductor (Tx2); and the fifth pull-up resistor (R5) may be coupled between the collector and the third DC input current source.

In further examples of the composite interface circuit, the third transistor (T3) may be an N-channel bipolar junction transistor ("BJT") having a base, an emitter, and a collector; and the base may be configured for being coupled with a second transmitter conductor (Tx2); and the fifth pull-up resistor (R5) may be coupled between the collector and the third DC input current source.

In additional examples of the composite interface circuit, the fourth transistor (T4) may be a field-effect transistor having a gate, a source, and a drain; and the gate may be configured for being coupled with the another voltage divider at the third node between the seventh resistor (R7) and the eighth resistor (R8); and the sixth pull-up resistor (R6) may be coupled between the drain and the fourth DC input current source.

In other examples of the composite interface circuit, the fourth transistor (T4) may be an N-channel enhancement-mode metal-oxide semiconductor field-effect transistor ("MOSFET") having a gate, a source, and a drain; and the gate may be configured for being coupled with the another voltage divider at the third node between the seventh resistor (R7) and the eighth resistor (R8); and the sixth pull-up resistor (R6) may be coupled between the drain and the fourth DC input current source.

In some examples of the composite interface circuit, the fourth transistor (T4) may be a bipolar junction transistor ("BJT") having a base, an emitter, and a collector; and the base may be configured for being coupled with the another voltage divider at the third node between the seventh resistor (R7) and the eighth resistor (R8); and the sixth pull-up resistor (R6) may be coupled between the collector and the fourth DC input current source.

In further examples of the composite interface circuit, the fourth transistor (T4) may be an N-channel bipolar junction transistor ("BJT") having a base, an emitter, and a collector; and the base may be configured for being coupled with the another voltage divider at the third node between the seventh resistor (R7) and the eighth resistor (R8); and the sixth pull-up resistor (R6) may be coupled between the collector and the fourth DC input current source.

In additional examples of the composite interface circuit, the bidirectional single-conductor bus and the third switching circuit and the fourth switching circuit may be incorporated into an integrated circuit.

In other examples of the composite interface circuit, the integrated circuit may be in the form of a microcontroller, an application-specific integrated circuit (ASIC), a digital signal processor (DSP), or a field-programmable gate array (FPGA).

In some examples, the composite interface circuit may further include a second full duplex universal asynchronous data communication interface having a second receiver conductor (Rx2) and a second transmitter conductor (Tx2), and the third switching circuit may be coupled with the second transmitter conductor (Tx2), and the fourth switching circuit may be coupled with the second receiver conductor (Rx2).

In further examples of the composite interface circuit, the second full duplex universal asynchronous data communication interface may be included in a microprocessor being incorporated in an active device.

In additional examples of the composite interface circuit, the second full duplex universal asynchronous data communication interface may be included in a microprocessor being incorporated in a lighting device.

In other examples of the composite interface circuit, the second full duplex universal asynchronous data communication interface may exchange bidirectional data communications with the microprocessor for controlling the lighting device.

In some examples of the composite interface circuit, the second full duplex universal asynchronous data communication interface may exchange bidirectional data communications with the microprocessor for controlling a lighting device that includes a semiconductor light-emitting device.

In further examples of the composite interface circuit, the second full duplex universal asynchronous data communication interface may exchange bidirectional data communications with the microprocessor for controlling a lighting device that includes a semiconductor light-emitting device.

In additional examples, the composite interface circuit may include an additional bidirectional single-conductor bus, and a fifth switching circuit, and a sixth switching circuit. In those examples, the composite interface circuit may include a ninth pull-up resistor (R9) being coupled between a fifth switching circuit and a fifth direct current ("DC") input current source having a ninth voltage (V9). Further in those examples of the composite interface circuit, the fifth switching circuit may include a fifth transistor (T5), and the fifth transistor (T5) may be coupled with the ninth pull-up resistor (R9) and with the bidirectional single-conductor bus. Also in those examples, the composite interface circuit may include a sixth switching circuit including a sixth transistor (T6), and the sixth transistor (T6) may be coupled by a tenth pull-up resistor (R10) with a sixth DC input current source having a tenth voltage (V10), and the sixth switching circuit may further include another voltage divider coupling the sixth transistor (T6) with the additional bidirectional single-conductor bus. In these examples of the composite interface circuit, the fifth switching circuit may be configured for being coupled with a third transmitter (Tx3) conductor; and the sixth switching circuit may be configured for being coupled with a third receiver (Rx3) conductor.

In some examples of the composite interface circuit, the another voltage divider may include a eleventh resistor (R11) and an twelfth resistor (R12), and the eleventh resistor (R11) may be coupled between the twelfth resistor (R12) and the bidirectional single-conductor bus, and the sixth transistor (T6) may be coupled with the another voltage divider at a fifth node between the eleventh resistor (R11) and the twelfth resistor (R12).

In further examples of the composite interface circuit, the another voltage divider may include the eleventh resistor (R11) and the twelfth resistor (R12) as being selected for reducing the ninth voltage (V9), at the fifth node, below a breakdown voltage of the sixth transistor (T6).

In additional examples of the composite interface circuit, the ninth voltage (V9) may be substantially higher than the tenth voltage (V10).

In other examples of the composite interface circuit, the another voltage divider may include the eleventh resistor (R11) and the twelfth resistor (R12) as being selected for reducing the ninth voltage (V9), at the fifth node, below a breakdown voltage of the sixth transistor (T6).

In some examples of the composite interface circuit, the ninth voltage (V9) may be at least about one order of magnitude higher than the tenth voltage (V10).

In further examples of the composite interface circuit, the ninth voltage (V9) may be selected as being substantially higher than the tenth voltage (V10), and the ninth pull-up resistor (R9) may be selected for causing the bidirectional single-conductor bus to be pulled up to a eleventh voltage (V11) being substantially higher than the tenth voltage (V10) so as to substantially increase a rate of rise of a parasitic capacitance of the fifth transistor (T5).

In additional examples of the composite interface circuit, the fifth transistor (T5) may have a fifth switching voltage threshold; and the eleventh voltage (V11) of the bidirectional single-conductor bus may be pulled down to zero volts when a voltage on the second transmitter conductor (Tx2) exceeds the fifth switching voltage threshold.

In other examples of the composite interface circuit, the ninth voltage (V9) may be selected as being substantially higher than the tenth voltage (V10), and the eleventh resistor (R11) and the twelfth resistor (R12) may be selected for causing the ninth voltage (V9) to be sufficiently divided at the fifth node so as to substantially increase a rate of rise of a parasitic capacitance of the sixth transistor (T6) at the fifth node.

In some examples of the composite interface circuit, the sixth transistor (T6) may have a sixth switching voltage threshold; and the eleventh voltage (V11) of the bidirectional single-conductor bus may cause an twelfth voltage (V12) at a sixth node between the sixth transistor (T6) and the second resistor (R2) to be pulled down to zero volts when a voltage at the fifth node exceeds the sixth switching voltage threshold.

In further examples of the composite interface circuit, the second voltage (V2), the sixth voltage (V6), and the tenth voltage (V10) each may be independently selected; and the third resistor (R3) and the fourth resistor (R4) may be selected for causing the first voltage (V1) to be sufficiently divided at the first node so as to substantially increase a rate of rise of a parasitic capacitance of the second transistor (T2) at the first node; and the seventh resistor (R7) and the eighth resistor (R8) may be selected for causing the fifth voltage (V5) to be sufficiently divided at the third node so as to substantially increase a rate of rise of a parasitic capacitance of the fourth transistor (T4) at the third node; and the eleventh resistor (R11) and the twelfth resistor (R12) may be selected for causing the ninth voltage (V9) to be sufficiently divided at the fifth node so as to substantially increase a rate of rise of a parasitic capacitance of the sixth transistor (T6) at the fifth node.

In additional examples of the composite interface circuit, the fifth transistor (T5) may be a field-effect transistor having a gate, a source, and a drain; and the gate may be configured for being coupled with a second transmitter conductor (Tx2); and the ninth pull-up resistor (R9) may be coupled between the drain and the third DC input current source.

In other examples of the composite interface circuit, the fifth transistor (T5) may be an N-channel enhancement-mode metal-oxide semiconductor field-effect transistor ("MOSFET") having a gate, a source, and a drain; and the gate may be configured for being coupled with a second transmitter conductor (Tx2); and the ninth pull-up resistor (R9) may be coupled between the drain and the third DC input current source.

In some examples of the composite interface circuit, the fifth transistor (T5) may be a bipolar junction transistor ("BJT") having a base, an emitter, and a collector; and the base may be configured for being coupled with a second transmitter conductor (Tx2); and the ninth pull-up resistor (R9) may be coupled between the collector and the third DC input current source.

In further examples of the composite interface circuit, the fifth transistor (T5) may be an N-channel bipolar junction transistor ("BJT") having a base, an emitter, and a collector; and the base may be configured for being coupled with a second transmitter conductor (Tx2); and the ninth pull-up resistor (R9) may be coupled between the collector and the third DC input current source.

In additional examples of the composite interface circuit, the sixth transistor (T6) may be a field-effect transistor having a gate, a source, and a drain; and the gate may be configured for being coupled with the another voltage divider at the fifth node between the eleventh resistor (R11) and the twelfth resistor (R12); and the tenth pull-up resistor (R10) may be coupled between the drain and the fourth DC input current source.

In other examples of the composite interface circuit, the sixth transistor (T6) may be an N-channel enhancement-mode metal-oxide semiconductor field-effect transistor ("MOSFET") having a gate, a source, and a drain; and the gate may be configured for being coupled with the another voltage divider at the fifth node between the eleventh resistor (R11) and the twelfth resistor (R12); and the tenth pull-up resistor (R10) may be coupled between the drain and the fourth DC input current source.

In some examples of the composite interface circuit, the sixth transistor (T6) may be a bipolar junction transistor ("BJT") having a base, an emitter, and a collector; and the base may be configured for being coupled with the another voltage divider at the fifth node between the eleventh resistor (R11) and the twelfth resistor (R12); and the tenth pull-up resistor (R10) may be coupled between the collector and the fourth DC input current source.

In further examples of the composite interface circuit, the sixth transistor (T6) may be an N-channel bipolar junction transistor ("BJT") having a base, an emitter, and a collector; and the base may be configured for being coupled with the another voltage divider at the fifth node between the eleventh resistor (R11) and the twelfth resistor (R12); and the tenth pull-up resistor (R10) may be coupled between the collector and the fourth DC input current source.

In additional examples of the composite interface circuit, the bidirectional single-conductor bus and the fifth switching circuit and the sixth switching circuit may be incorporated into an integrated circuit.

In other examples of the composite interface circuit, the integrated circuit may be in the form of a microcontroller, an application-specific integrated circuit (ASIC), a digital signal processor (DSP), or a field-programmable gate array (FPGA).

In some examples, the composite interface circuit may further include a third full duplex universal asynchronous data communication interface having a third receiver (Rx3) conductor and a third transmitter (Tx3) conductor, and the fifth switching circuit may be coupled with the third transmitter (Tx3) conductor, and the sixth switching circuit may be coupled with the third receiver (Rx3) conductor.

In further examples of the composite interface circuit, the third full duplex universal asynchronous data communication interface may be included in a microprocessor being incorporated in an active device.

In additional examples of the composite interface circuit, the third full duplex universal asynchronous data communication interface may be included in a microprocessor being incorporated in a lighting device.

In other examples of the composite interface circuit, the third full duplex universal asynchronous data communication interface may exchange bidirectional data communications with the microprocessor for controlling the lighting device.

In some examples of the composite interface circuit, the third full duplex universal asynchronous data communication interface may exchange bidirectional data communications with the microprocessor for controlling a lighting device that includes a semiconductor light-emitting device.

In further examples of the composite interface circuit, the third full duplex universal asynchronous data communication interface may exchange bidirectional data communications with the microprocessor for controlling a lighting device that includes a semiconductor light-emitting device.

Other systems, devices, processes, features and advantages of the invention will be or will become apparent to one with skill in the art upon examination of the following FIGURES and detailed description. It is intended that all such additional systems, devices, processes, features and advantages be included within this description, be within the scope of the invention, and be protected by the accompanying claims.

BRIEF DESCRIPTION OF THE FIGURES

The invention can be better understood with reference to the following FIGURE. The components in the FIGURE are not necessarily to scale, emphasis instead being placed upon illustrating the principles of the invention. It is understood that the FIGURE shows optional elements of examples of the composite interface circuit, as are identified and explained in the detailed description. Moreover, in the FIGURE, like reference numerals designate corresponding parts throughout the different views.

FIG. 1 is a schematic diagram showing examples [100] of an implementation of a composite interface circuit.

DETAILED DESCRIPTION

Various universal asynchronous receiver/transmitter circuits have been developed for providing data communications. Despite these efforts, such universal asynchronous receiver/transmitter circuits often have demonstrably failed to enable multiple microprocessor-containing devices to exchange data communications over a conductor bus. More specifically, there is a need for interface circuits enabling data communications among a plurality of full duplex universal asynchronous data communication interfaces (UArts) each having a receiver conductor (Rx) and a transmitter conductor (Tx), such data communication interfaces potentially having different operating voltages. Furthermore, there is a need for such interface circuits enabling data communications at substantially increased baud rates among a plurality of full duplex universal asynchronous data communication interfaces (UArts) each having a receiver conductor (Rx) and a transmitter conductor (Tx). As explained below, in the examples [100] of the composite interface circuit, switching circuits are provided that include transistors being arranged in the composite interface circuits so as to result in increased initial rates of rise of parasitic capacitance of the transistors. Consequently, the switching circuits may be more rapidly cycled between open and closed (i.e., off and on) states, which facilitates higher baud rates of data communications between a plurality of full duplex universal asynchronous data communication interfaces (UArts). In some examples [100] of the composite interface circuit, a first voltage (V1) may be selected as being substantially higher than a second voltage (V2); and a third resistor (R3) and a fourth resistor (R4) may be selected for causing the first voltage (V1) to be sufficiently divided at a first node [110] so as to substantially increase an initial rate of rise of a parasitic capacitance of a second transistor (T2) at a first node [110]. In additional examples [100], the composite interface circuit may facilitate data communications among a plurality of full duplex universal asynchronous data communication interfaces (UArts) each having a receiver conductor (Rx) and a transmitter conductor (Tx), in which some or all of the plurality of the full duplex universal asynchronous data communication interfaces (UArts) may have different operating voltages. In an example [100] of the composite interface circuit discussed below, each among three full duplex universal asynchronous data communication interfaces (UArt1), (UArt2), and (UArt3), may respectively have independently selected operating voltages respectively shown in the FIGURE as being a second voltage (V2), and a sixth voltage (V6), and a tenth voltage (V10). As an example [100] of the composite interface circuit, the second voltage (V2) may be selected as being about five volts; and the sixth voltage (V6) may be independently selected as being about two and one-half volts, and the tenth voltage (V10) may be independently selected as being about three and one-third volts.

Accordingly, in an example of an implementation, a composite interface circuit is provided, including a bidirectional single-conductor bus, a first switching circuit, and a second switching circuit. The composite interface circuit is for coupling together: (a) a first full duplex universal asynchronous data communication interface having a first receiver conductor (Rx1) and a first transmitter conductor (Tx1); and (b) a second full duplex universal asynchronous data communication interface having a second receiver conductor (Rx2) and a second transmitter conductor (Tx2). In the example of the composite interface circuit, the bidirectional single-conductor bus is coupled by a first pull-up resistor (R1) with a first direct current ("DC") input current source having a first voltage (V1). The first switching circuit in the example of the composite interface circuit includes a first transistor (T1), the first transistor (T1) being coupled with the first pull-up resistor (R1) and with the bidirectional single-conductor bus. Further in the example of the composite interface circuit, the second switching circuit includes a second transistor (T2), the second transistor (T2) being coupled by a second pull-up resistor (R2) with a second DC input current source having a second voltage (V2), the second switching circuit further including a voltage divider coupling the second transistor (T2) with the bidirectional single-conductor bus. In the example of the composite interface circuit, the first switching circuit is configured for being coupled with a first transmitter conductor (Tx1), and the second switching circuit is configured for being coupled with a first receiver conductor (Rx1).

The following definitions of terms, being stated as applying "throughout this specification", are hereby deemed to be incorporated throughout this specification, including but not limited to the Summary, Brief Description of the FIGURES, Detailed Description, and Claims.

Throughout this specification, the term "switched-mode power supply" (SMPS) means an electronic power supply that includes a switching regulator for turning on and off the power to an output load such as, for example, a semiconductor light-emitting device.

Throughout this specification, the term "DC-to-DC step-down converter" means an SMPS that converts a source of direct current (DC) from a first voltage to a second voltage being less than the first voltage, and having a switch being positioned for turning on and off the power to an output load, and that generates a signal for controlling the on- and off-conditions of the switch.

Throughout this specification, the term "controller" means: a device being suitable for generating a signal for turning on and off the power to an output load, and which may or may not include a switch being positioned for turning on and off the power to an output load.

Throughout this specification, the term "microcontroller" means a multipurpose, programmable device that accepts digital data as input, and processes the digital data according to instructions stored in the programmable device's memory, and provides results as output.

Throughout this specification, the term "semiconductor" means: a substance, examples including a solid chemical element or compound, that can conduct electricity under some conditions but not others, making the substance a good medium for the control of electrical current.

Throughout this specification, the term "semiconductor light-emitting device" (also being abbreviated as "SLED") means: a light-emitting diode; an organic light-emitting diode; a laser diode; or any other light-emitting device having one or more layers containing inorganic and/or organic semiconductor(s). Throughout this specification, the term "light-emitting diode" (herein also referred to as an "LED") means: a two-lead semiconductor light source having an active pn-junction. As examples, an LED may include a series of semiconductor layers that may be epitaxially grown on a substrate such as, for example, a substrate that includes sapphire, silicon, silicon carbide, gallium nitride or gallium arsenide. Further, for example, one or more semiconductor p-n junctions may be formed in these epitaxial layers. When a sufficient voltage is applied across the p-n junction, for example, electrons in the n-type semiconductor layers and holes in the p-type semiconductor layers may flow toward the p-n junction. As the electrons and holes flow toward each other, some of the electrons may recombine with corresponding holes, and emit photons. The energy release is called electroluminescence, and the color of the light, which corresponds to the energy of the photons, is determined by the energy band gap of the semiconductor. As examples, a spectral power distribution of the light generated by an LED may generally depend on the particular semiconductor materials used and on the structure of the thin epitaxial layers that make up the "active region" of the device, being the area where the light is generated. As examples, an LED may have a light-emissive electroluminescent layer including an inorganic semiconductor, such as a Group III-V semiconductor, examples including: gallium nitride; silicon; silicon carbide; and zinc oxide. Throughout this specification, the term "organic light-emitting diode" (herein also referred to as an "OLED") means: an LED having a light-emissive electroluminescent layer including an organic semiconductor, such as small organic molecules or an organic polymer. It is understood throughout this specification that a semiconductor light-emitting device may include: a non-semiconductor-substrate or a semiconductor-substrate; and may include one or more electrically-conductive contact layers. Further, it is understood throughout this specification that an LED may include a substrate formed of materials such as, for example: silicon carbide; sapphire; gallium nitride; or silicon. It is additionally understood throughout this specification that a semiconductor light-emitting device may have a cathode contact on one side and an anode contact on an opposite side, or may alternatively have both contacts on the same side of the device.

Further background information regarding semiconductor light-emitting devices is provided in the following documents, the entireties of all of which hereby are incorporated by reference herein: U.S. Pat. Nos. 7,564,180; 7,456,499; 7,213,940; 7,095,056; 6,958,497; 6,853,010; 6,791,119; 6,600,175; 6,201,262; 6,187,606; 6,120,600; 5,912,477; 5,739,554; 5,631,190; 5,604,135; 5,523,589; 5,416,342; 5,393,993; 5,359,345; 5,338,944; 5,210,051; 5,027,168; 5,027,168; 4,966,862; and 4,918,497; and U.S. Patent Application Publication Nos. 2014/0225511; 2014/0078715; 2013/0241392; 2009/0184616; 2009/0080185; 2009/

0050908; 2009/0050907; 2008/0308825; 2008/0198112; 2008/0179611; 2008/0173884; 2008/0121921; 2008/0012036; 2007/0253209; 2007/0223219; 2007/0170447; 2007/0158668; 2007/0139923; and 2006/0221272.

Throughout this specification, the term "configured" means "specifically set up for operation especially in a particular way."

Throughout this specification, it is understood that in addition to the examples of ranges, including the examples of ranges for voltages and currents, other ranges may be utilized.

It is understood throughout this specification that numbering of the names of elements as being "first", "second" etcetera, is solely for purposes of clarity in referring to such elements in connection with various examples of lighting systems.

FIG. 1 is a schematic diagram showing an example [100] of an implementation of a composite interface circuit. As shown in FIG. 1, the example [100] of the implementation of the composite interface circuit includes a bidirectional single-conductor bus [102], a first switching circuit [104], and a second switching circuit [106]. In the example [100], the composite interface circuit is for coupling together (a) a first full duplex universal asynchronous data communication interface (UArt1) having a first receiver conductor (Rx1) and a first transmitter conductor (Tx1) and (b) a second full duplex universal asynchronous data communication interface (UArt2) not shown, the (UArt2) having a second receiver conductor (Rx2) not shown, and the (UArt2) further having a second transmitter conductor (Tx2) not shown. In the example [100] of the composite interface circuit, the bidirectional single-conductor bus [102] is coupled by a first pull-up resistor (R1) with a first direct current ("DC") input current source (CS1) having a first voltage (V1). In the example [100] of the composite interface circuit, the first switching circuit [104] includes a first transistor (T1), the first transistor (T1) being coupled with the first pull-up resistor (R1) and with the bidirectional single-conductor bus [102]. In the example [100] of the composite interface circuit, the second switching circuit [106] includes a second transistor (T2), the second transistor (T2) being coupled by a second pull-up resistor (R2) with a second DC input current source (CS2) having a second voltage (V2), the second switching circuit [106] further including a voltage divider [108] coupling the second transistor (T2) with the bidirectional single-conductor bus [102]. The first switching circuit [104] in the example [100] of the composite interface circuit is configured for being coupled with a first transmitter conductor (Tx1) of a first full duplex universal asynchronous data communication interface (UArt1) not shown. The second switching circuit [106] in the example [100] of the composite interface circuit is configured for being coupled with a first receiver conductor (Rx1) of a first full duplex universal asynchronous data communication interface (UArt1) not shown.

In some examples [100] of the composite interface circuit, the voltage divider [108] may include a third resistor (R3) and a fourth resistor (R4); and the third resistor (R3) may be coupled between the fourth resistor (R4) and the bidirectional single-conductor bus [102]. Further in those examples [100] of the composite interface circuit, the second transistor (T2) may be coupled with the voltage divider [108] at a first node [110] between the third resistor (R3) and the fourth resistor (R4). Also in those examples [100] of the composite interface circuit, the voltage divider [108] may include the third resistor (R3) and the fourth resistor (R4) as being selected for reducing the first voltage (V1), at the first node [110], below a breakdown voltage of the second transistor (T2). In some of those examples [100] of the composite interface circuit, the first voltage (V1) may be substantially higher than the second voltage (V2). It is understood throughout this specification that a first voltage (V1) is considered to be substantially higher than a second voltage (V2) if the first voltage (V1) is at least about fifty percent (50%) higher than the second voltage (V2). In further examples [100] of the composite interface circuit, the first voltage (V1) may be at least about one order of magnitude higher than the second voltage (V2).

In some examples [100] of the composite interface circuit, the first voltage (V1) may be selected as being substantially higher than the second voltage (V2); and the first pull-up resistor (R1) may be selected for causing the bidirectional single-conductor bus [102] to be pulled up to a third voltage (V3) being substantially higher than the second voltage (V2) so as to substantially increase a rate of rise of a parasitic capacitance of the first transistor (T1). It is understood throughout this specification that if the first voltage (V1) in an example [100] of the composite interface circuit is selected as being substantially higher than the second voltage (V2) and if the first pull-up resistor (R1) is selected for causing the bidirectional single-conductor bus [102] to be pulled up to the third voltage (V3) as being substantially higher than the second voltage (V2) then the resulting rate of rise of the parasitic capacitance of the first transistor (T1) is considered to be substantially increased, in comparison with another example [100] of the composite interface circuit in which the first voltage (V1) is selected as not being substantially higher than the second voltage (V2) and in which the first pull-up resistor (R1) is selected as causing the bidirectional single-conductor bus [102] to be pulled up to the third voltage (V3) as not being substantially higher than the second voltage (V2).

In some examples [100] of the composite interface circuit, the first transistor (T1) may have a first switching voltage threshold; and the third voltage (V3) of the bidirectional single-conductor bus [102] may be pulled down to zero volts when a voltage on the first transmitter conductor (Tx1) exceeds the first switching voltage threshold.

In further examples [100] of the composite interface circuit, the first voltage (V1) may be selected as being substantially higher than the second voltage (V2); and the third resistor (R3) and the fourth resistor (R4) may be selected for causing the first voltage (V1) to be sufficiently divided at the first node [110] so as to substantially increase a rate of rise of a parasitic capacitance of the second transistor (T2) at the first node [110]. It is understood throughout this specification that if the first voltage (V1) in an example [100] of the composite interface circuit is selected as being substantially higher than the second voltage (V2) and if the third resistor (R3) and the fourth resistor (R4) are selected for causing the first voltage (V1) to be reduced by at least about fifty percent (50%) at the first node [110] then the resulting rate of rise of the parasitic capacitance of the second transistor (T2) is considered to be substantially increased, in comparison with another example [100] of the composite interface circuit in which the first voltage (V1) is selected as not being substantially higher than the second voltage (V2) and in which the third resistor (R3) and the fourth resistor (R4) are selected as causing the first voltage (V1) to not be reduced by at least about fifty percent (50%) at the first node [110].

In some examples [100] of the composite interface circuit, the second transistor (T2) may have a second switching voltage threshold; and the third voltage (V3) of the bidirectional single-conductor bus [102] may cause a fourth voltage (V4) at a second node [112] between the second transistor (T2) and the second resistor (R2) to be pulled down to zero volts when a voltage at the first node [110] exceeds the second switching voltage threshold.

In additional examples [100] of the composite interface circuit, the first transistor (T1) may be a field-effect transistor having a gate [G], a source [S], and a drain [D]; and the gate [G] may be configured for being coupled with a first transmitter conductor (Tx1); and the first pull-up resistor (R1) may be coupled between the drain [D] and the first DC input current source [CS1]. In some of those examples [100] of the composite interface circuit, the first transistor (T1) may be an N-channel enhancement-mode metal-oxide semiconductor field-effect transistor ("MOSFET") having the gate [G], the source [S], and the drain [D]; and the gate [G] may be configured for being coupled with a first transmitter conductor (Tx1); and the first pull-up resistor (R1) may be coupled between the drain [D] and the first DC input current source [CS1].

In other examples [100] of the composite interface circuit, the first transistor (T1) may be (not shown) a bipolar junction transistor ("BJT") having a base, an emitter, and a collector; and the base may be configured for being coupled with a first transmitter conductor (Tx1); and the first pull-up resistor (R1) may be coupled between the collector and the first DC input current source [CS1]. Further in those examples [100] of the composite interface circuit, the first transistor (T1) may be (not shown) an N-channel bipolar junction transistor ("BJT") having a base, an emitter, and a collector; and the base may be configured for being coupled with a first transmitter conductor (Tx1); and the first pull-up resistor (R1) may be coupled between the collector and the first DC input current source [CS1].

In some examples [100] of the composite interface circuit, the second transistor (T2) may be a bipolar junction transistor ("BJT") having a base [B], an emitter [E], and a collector [C]; and the base [B] may be configured for being coupled with the voltage divider [108] at the first node [110] between the third resistor (R3) and the fourth resistor (R4); and the second pull-up resistor (R2) may be coupled between the collector [C] and the second DC input current source [CS2]. Further in those examples [100] of the composite interface circuit, the second transistor (T2) may be an N-channel bipolar junction transistor ("BJT") having the base [B], the emitter [E], and the collector [C]; and the base [B] may be configured for being coupled with the voltage divider [108] at the first node [110] between the third resistor (R3) and the fourth resistor (R4); and the second pull-up resistor (R2) may be coupled between the collector [C] and the second DC input current source [CS2].

In other examples [100] of the composite interface circuit, the second transistor (T2) may be (not shown) a field-effect transistor having a gate, a source, and a drain; and the gate may be configured for being coupled with the voltage divider [108] at the first node [110] between the third resistor (R3) and the fourth resistor (R4); and the second pull-up resistor (R2) may be coupled between the drain and the second DC input current source [CS2]. Further in those examples [100] of the composite interface circuit, the second transistor (T2) may be (not shown) an N-channel enhancement-mode metal-oxide semiconductor field-effect transistor ("MOSFET") having the gate, the source, and the drain; and the gate may be configured for being coupled with the voltage divider [108] at the first node [110] between the third resistor (R3) and the fourth resistor (R4); and the second pull-up resistor (R2) may be coupled between the drain and the second DC input current source [CS2].

In some examples [100] of the composite interface, the bidirectional single-conductor bus [102] and the first switching circuit [104] and the second switching circuit [106] may be incorporated into an integrated circuit (not shown). Further in those examples [100] of the composite interface, the integrated circuit (not shown) may be in the form of a microcontroller, an application-specific integrated circuit (ASIC), a digital signal processor (DSP), or a field-programmable gate array (FPGA).

In examples [100], the composite interface circuit may further include a first full duplex universal asynchronous data communication interface (UArt1) having a first receiver conductor (Rx1) and a first transmitter conductor (Tx1), and the first switching circuit [104] may be coupled with the first transmitter conductor (Tx1), and the second switching circuit [106] may be coupled with the first receiver conductor (Rx1). In some of those examples [100] of the composite interface circuit, the first transistor (T1) may be a field-effect transistor having a gate [G], a source [S], and a drain [D]; and the gate [G] may be configured for being coupled with a first transmitter conductor (Tx1). In others of those examples [100] of the composite interface circuit, the first transistor (T1) may be (not shown) a bipolar junction transistor ("BJT") having a base, an emitter, and a collector; and the base may be configured for being coupled with a first transmitter conductor (Tx1). In some of those examples [100] of the composite interface circuit, the second transistor (T2) may be a bipolar junction transistor ("BJT") having a base [B], an emitter [E], and a collector [C]; and the collector [C] may be configured for being coupled with a first receiver conductor (Rx1). In others of those examples [100] of the composite interface circuit, the second transistor (T2) may be (not shown) a field-effect transistor having a gate, a source, and a drain; and the drain may be configured for being coupled with a first receiver conductor (Rx1).

In some of those examples [100] of the composite interface, the first full duplex universal asynchronous data communication interface (UArt1) is included in a microprocessor (MP) being incorporated in an active device (AD). It is understood throughout this specification that the term "active device" means a circuit component with the ability to electrically control electric charge flow, i.e., an active device is a circuit component with the ability to utilize electricity to control an electric charge flow (electricity controlling electricity). Further in those examples [100] of the composite interface, the first full duplex universal asynchronous data communication interface (UArt1) may be included in a microprocessor (MP) of an active device (AD) being a lighting device (not shown). Additionally in those examples [100] of the composite interface, the first full duplex universal asynchronous data communication interface (UArt1) may exchange bidirectional data communications with the microprocessor (MP) for controlling the active device (AD). Also in those examples [100] of the composite interface, the first full duplex universal asynchronous data communication interface (UArt1) may exchange bidirectional data communications with the microprocessor (MP) for controlling the active device (AD) as being a lighting device (not shown). Further in those examples [100] of the composite interface, the first full duplex universal asynchronous data communication interface (UArt1) may exchange bidirectional data communications with the microprocessor (MP) for controlling a lighting device (not shown) that includes a semiconductor light-emitting device. In others of those examples [100] of the composite interface, the first full duplex universal asynchronous data communication interface (UArt1) may exchange bidirectional data communications with the microprocessor (MP) for controlling the active device as including, as examples, a switched-mode power supply (SMPS), a backup battery power supply, or a controller.

In some examples [100], the composite interface circuit may further include another bidirectional single-conductor bus [103], and a third switching circuit [114], and a fourth switching circuit [116]. In these examples [100] of the composite interface circuit, the another bidirectional single-conductor bus [103] may be coupled by a fifth pull-up resistor (R5) with a third DC input current source (CS3) having a fifth voltage (V5). In these examples [100] of the composite interface circuit, the third switching circuit [114] may include a third transistor (T3), the third transistor (T3) being coupled with the fifth pull-up resistor (R5) and with the another bidirectional single-conductor bus [103]. In these examples [100] of the composite interface circuit, the fourth switching circuit [116] may include a fourth transistor (T4), the fourth transistor (T4) being coupled by a sixth pull-up resistor (R6) with a fourth DC input current source (CS4) having a sixth voltage (V6), the fourth switching circuit [116] further including another voltage divider [109] coupling the fourth transistor (T4) with the another bidirectional single-conductor bus [103]. The third switching circuit [114] in these examples [100] of the composite interface circuit may be configured for being coupled with a second transmitter conductor (Tx2) of a second full duplex universal asynchronous data communication interface (UArt2). The fourth switching circuit [116] in these examples [100] of the composite interface circuit may be configured for being coupled with a second receiver conductor (Rx2) of a second full duplex universal asynchronous data communication interface (UArt2).

In some examples [100] of the composite interface circuit, the another voltage divider [109] may include a seventh resistor (R7) and an eighth resistor (R8); and the seventh resistor (R7) may be coupled between the eighth resistor (R8) and the another bidirectional single-conductor bus [103]. Further in those examples [100] of the composite interface circuit, the fourth transistor (T4) may be coupled with the another voltage divider [109] at a third node [118] between the seventh resistor (R7) and the eighth resistor (R8). Also in those examples [100] of the composite interface circuit, the another voltage divider [109] may include the seventh resistor (R7) and the eighth resistor (R8) as being selected for reducing the fifth voltage (V5), at the third node [118], below a breakdown voltage of the fourth transistor (T4). In some of those examples [100] of the composite interface circuit, the fifth voltage (V5) may be substantially higher than the sixth voltage (V6). It is understood throughout this specification that a fifth voltage (V5) is considered to be substantially higher than a sixth voltage (V6) if the fifth voltage (V5) is at least about fifty percent (50%) higher than the sixth voltage (V6). In further examples [100] of the composite interface circuit, the fifth voltage (V5) may be at least about one order of magnitude higher than the sixth voltage (V6).

In some examples [100] of the composite interface circuit, the fifth voltage (V5) may be selected as being substantially higher than the sixth voltage (V6); and the fifth pull-up resistor (R5) may be selected for causing the another bidirectional single-conductor bus [103] to be pulled up to a seventh voltage (V7) being substantially higher than the sixth voltage (V6) so as to substantially increase a rate of rise of a parasitic capacitance of the third transistor (T3). It is understood throughout this specification that if the fifth voltage (V5) in an example [100] of the composite interface circuit is selected as being substantially higher than the sixth voltage (V6) and if the fifth pull-up resistor (R5) is selected for causing the another bidirectional single-conductor bus [103] to be pulled up to the seventh voltage (V7) as being substantially higher than the sixth voltage (V6) then the resulting rate of rise of the parasitic capacitance of the third transistor (T3) is considered to be substantially increased, in comparison with another example [100] of the composite interface circuit in which the fifth voltage (V5) is selected as not being substantially higher than the sixth voltage (V6) and in which the fifth pull-up resistor (R5) is selected as causing the another bidirectional single-conductor bus [103] to be pulled up to the seventh voltage (V7) as not being substantially higher than the sixth voltage (V6).

In some examples [100] of the composite interface circuit, the third transistor (T3) may have a third switching voltage threshold; and the seventh voltage (V7) of the another bidirectional single-conductor bus [103] may be pulled down to zero volts when a voltage on the second transmitter conductor (Tx2) exceeds the third switching voltage threshold.

In further examples [100] of the composite interface circuit, the fifth voltage (V5) may be selected as being substantially higher than the sixth voltage (V6); and the seventh resistor (R7) and the eighth resistor (R8) may be selected for causing the fifth voltage (V5) to be sufficiently divided at the third node [118] so as to substantially increase a rate of rise of a parasitic capacitance of the fourth transistor (T4) at the third node [118]. It is understood throughout this specification that if the fifth voltage (V5) in an example [100] of the composite interface circuit is selected as being substantially higher than the sixth voltage (V6) and if the seventh resistor (R7) and the eighth resistor (R8) are selected for causing the fifth voltage (V5) to be reduced by at least about fifty percent (50%) at the third node [118] then the resulting rate of rise of the parasitic capacitance of the fourth transistor (T4) is considered to be substantially increased, in comparison with another example [100] of the composite interface circuit in which the fifth voltage (V5) is selected as not being substantially higher than the sixth voltage (V6) and in which the seventh resistor (R7) and the eighth resistor (R8) are selected as causing the fifth voltage (V5) to not be reduced by at least about fifty percent (50%) at the third node [118].

In some examples [100] of the composite interface circuit, the fourth transistor (T4) may have a fourth switching voltage threshold; and the seventh voltage (V7) of the another bidirectional single-conductor bus [103] may cause an eighth voltage (V8) at a fourth node [120] between the fourth transistor (T4) and the sixth resistor (R6) to be pulled down to zero volts when a voltage at the third node [118] exceeds the fourth switching voltage threshold.

In some examples [100] of the composite interface circuit, the second voltage (V2) may be selected independently of selecting the sixth voltage (V6), and the third resistor (R3) and the fourth resistor (R4) may be selected for causing the first voltage (V1) to be sufficiently divided at the first node [110] so as to substantially increase the rate of rise of the parasitic capacitance of the second transistor (T2) at the first node [110], and the seventh resistor (R7) and the eighth resistor (R8) may be selected for causing the fifth voltage (V5) to be sufficiently divided at the third node [118] so as to substantially increase the rate of rise of the parasitic capacitance of the fourth transistor (T4) at the third node [118]. As an example [100] of the composite interface circuit, the second voltage (V2) may be selected as being about five volts; and the sixth voltage (V6) may be independently selected as being about two and one-half volts, or about three and one-third volts. It is understood throughout this specification that the selected voltages in that example [100] of the composite interface circuit are merely examples, and that in the examples [100] of the composite interface circuit, each one among the second voltage (V2) and the sixth voltage (V6) may have other values.

In further examples [100] of the composite interface circuit, the bidirectional single-conductor bus [102] and the another bidirectional single-conductor bus [103] may be coupled together by a conductor [123]. In those further examples [100] of the composite interface circuit, (V1) and (V5) may be the same, or may be different, with suitable voltage adjustments being provided at their interconnection.

In additional examples [100] of the composite interface circuit, the third transistor (T3) may be a field-effect transistor having a gate [G], a source [S], and a drain [D]; and the gate [G] may be configured for being coupled with a second transmitter conductor (Tx2); and the fifth pull-up resistor (R5) may be coupled between the drain [D] and the third DC input current source [CS3]. In some of those examples [100] of the composite interface circuit, the third transistor (T3) may be an N-channel enhancement-mode metal-oxide semiconductor field-effect transistor ("MOSFET") having the gate [G], the source [S], and the drain [D]; and the gate [G] may be configured for being coupled with a second transmitter conductor (Tx2); and the fifth pull-up resistor (R5) may be coupled between the drain [D] and the third DC input current source [CS3].

In other examples [100] of the composite interface circuit, the third transistor (T3) may be (not shown) a bipolar junction transistor ("BJT") having a base, an emitter, and a collector; and the base may be configured for being coupled with a second transmitter conductor (Tx2); and the fifth pull-up resistor (R5) may be coupled between the collector and the third DC input current source [CS3]. Further in those examples [100] of the composite interface circuit, the third transistor (T3) may be (not shown) an N-channel bipolar junction transistor ("BJT") having a base, an emitter, and a collector; and the base may be configured for being coupled with a second transmitter conductor (Tx2); and the fifth pull-up resistor (R5) may be coupled between the collector and the third DC input current source [CS3].

In some examples [100] of the composite interface circuit, the fourth transistor (T4) may be a bipolar junction transistor ("BJT") having a base [B], an emitter [E], and a collector [C]; and the base [B] may be configured for being coupled with the another voltage divider [109] at the third node [118] between the seventh resistor (R7) and the eighth resistor (R8); and the sixth pull-up resistor (R6) may be coupled between the collector [C] and the fourth DC input current source [CS4]. Further in those examples [100] of the composite interface circuit, the fourth transistor (T4) may be an N-channel bipolar junction transistor ("BJT") having the base [B], the emitter [E], and the collector [C]; and the base [B] may be configured for being coupled with the another voltage divider [109] at the third node [118] between the seventh resistor (R7) and the eighth resistor (R8); and the sixth pull-up resistor (R6) may be coupled between the collector [C] and the fourth DC input current source [CS4].

In other examples [100] of the composite interface circuit, the fourth transistor (T4) may be (not shown) a field-effect transistor having a gate, a source, and a drain; and the gate may be configured for being coupled with the another voltage divider [109] at the third node [118] between the seventh resistor (R7) and the eighth resistor (R8); and the sixth pull-up resistor (R6) may be coupled between the drain and the fourth DC input current source [CS4]. Further in those examples [100] of the composite interface circuit, the fourth transistor (T4) may be (not shown) an N-channel enhancement-mode metal-oxide semiconductor field-effect transistor ("MOSFET") having the gate, the source, and the drain; and the gate may be configured for being coupled with the another voltage divider [109] at the third node [118] between the seventh resistor (R7) and the eighth resistor (R8); and the sixth pull-up resistor (R6) may be coupled between the drain and the fourth DC input current source [CS4].

In some examples [100] of the composite interface, the another bidirectional single-conductor bus [103] and the third switching circuit [114] and the fourth switching circuit [116] may be incorporated into an integrated circuit (not shown). Further in those examples [100] of the composite interface, the integrated circuit (not shown) may be in the form of a microcontroller, an application-specific integrated circuit (ASIC), a digital signal processor (DSP), or a field-programmable gate array (FPGA).

In examples [100], the composite interface circuit may further include a second full duplex universal asynchronous data communication interface (UArt2) having a second receiver conductor (Rx2) and a second transmitter conductor (Tx2), and the third switching circuit [114] may be coupled with the second transmitter conductor (Tx2), and the fourth switching circuit [116] may be coupled with the second receiver conductor (Rx2). In some of those examples [100] of the composite interface circuit, the third transistor (T3) may be a field-effect transistor having a gate [G], a source [S], and a drain [D]; and the gate [G] may be configured for being coupled with a second transmitter conductor (Tx2). In others of those examples [100] of the composite interface circuit, the third transistor (T3) may be (not shown) a bipolar junction transistor ("BJT") having a base, an emitter, and a collector; and the base may be configured for being coupled with a second transmitter conductor (Tx2). In some of those examples [100] of the composite interface circuit, the fourth transistor (T4) may be a bipolar junction transistor ("BJT") having a base [B], an emitter [E], and a collector [C]; and the collector [C] may be configured for being coupled with a second receiver conductor (Rx2). In others of those examples [100] of the composite interface circuit, the fourth transistor (T4) may be (not shown) a field-effect transistor having a gate, a source, and a drain; and the drain may be configured for being coupled with a second receiver conductor (Rx2).

In some of those examples [100] of the composite interface, the second full duplex universal asynchronous data communication interface (UArt2) may be included in a microprocessor (MP) being incorporated in an active device (AD). It is understood throughout this specification that the term "active device" means a circuit component with the ability to electrically control electric charge flow, i.e., an active device is a circuit component with the ability to utilize electricity to control an electric charge flow (electricity controlling electricity). Further in those examples [100] of the composite interface, the second full duplex universal asynchronous data communication interface (UArt2) may be included in a microprocessor (MP) of an active device (AD) being a lighting device (not shown). Additionally in those examples [100] of the composite interface, the second full duplex universal asynchronous data communication interface (UArt2) may exchange bidirectional data communications with the microprocessor (MP) for controlling the active device (AD). Also in those examples [100] of the composite interface, the second full duplex universal asynchronous data communication interface (UArt2) may exchange bidirectional data communications with the microprocessor (MP) for controlling the active device (AD) as being a lighting device (not shown). Further in those examples [100] of the composite interface, the second full duplex universal asynchronous data communication interface (UArt2) may exchange bidirectional data communications with the microprocessor (MP) for controlling a lighting device (not shown) that includes a semiconductor light-emitting device. In others of those examples [100] of the composite interface, the second full duplex universal asynchronous data communication interface (UArt2) may exchange bidirectional data communications with the microprocessor (MP) for controlling the active device as including, as examples, a switched-mode power supply (SMPS), a backup battery power supply, or a controller.

In some examples [100], the composite interface circuit may include a further bidirectional single-conductor bus [105], and a fifth switching circuit [115], and a sixth switching circuit [117]. In these examples [100] of the composite interface circuit, the further bidirectional single-conductor bus [105] may be coupled by a ninth pull-up resistor [R9] with a fifth DC input current source (CS5) having a ninth voltage (V9). In these examples [100] of the composite interface circuit, the fifth switching circuit [115] may include a fifth transistor (T5), the fifth transistor (T5) being coupled with the ninth pull-up resistor [R9] and with the further bidirectional single-conductor bus [105]. In these examples [100] of the composite interface circuit, the sixth switching circuit [117] may include a sixth transistor (T6), the sixth transistor (T6) being coupled by a tenth pull-up resistor (R10) with a sixth DC input current source having a tenth voltage (V10), the sixth switching circuit [117] including a further voltage divider [113] coupling the sixth transistor (T6) with the further bidirectional single-conductor bus [105]. The fifth switching circuit [115] in these examples [100] of the composite interface circuit may be configured for being coupled with a third transmitter conductor (Tx3) of a third full duplex universal asynchronous data communication interface (UArt3). The sixth switching circuit [117] in these examples [100] of the composite interface circuit may be configured for being coupled with a third receiver conductor (Rx3) of a third full duplex universal asynchronous data communication interface (UArt3).

In some examples [100] of the composite interface circuit, the further voltage divider [113] may include a eleventh resistor (R11) and an twelfth resistor (R12); and the eleventh resistor (R11) may be coupled between the twelfth resistor (R12) and the further bidirectional single-conductor bus [105]. Further in those examples [100] of the composite interface circuit, the sixth transistor (T6) may be coupled with the further voltage divider [113] at a fifth node [119] between the eleventh resistor (R11) and the twelfth resistor (R12). Also in those examples [100] of the composite interface circuit, the further voltage divider [113] may include the eleventh resistor (R11) and the twelfth resistor (R12) as being selected for reducing the ninth voltage (V9), at the fifth node [119], below a breakdown voltage of the sixth transistor (T6). In some of those examples [100] of the composite interface circuit, the ninth voltage (V9) may be substantially higher than the tenth voltage (V10). It is understood throughout this specification that a ninth voltage (V9) is considered to be substantially higher than a tenth voltage (V10) if the ninth voltage (V9) is at least about fifty percent (50%) higher than the tenth voltage (V10). In further examples [100] of the composite interface circuit, the ninth voltage (V9) may be at least about one order of magnitude higher than the tenth voltage (V10).

In some examples [100] of the composite interface circuit, the ninth voltage (V9) may be selected as being substantially higher than the tenth voltage (V10); and the ninth pull-up resistor [R9] may be selected for causing the further bidirectional single-conductor bus [105] to be pulled up to a eleventh voltage (V11) being substantially higher than the tenth voltage (V10) so as to substantially increase a rate of rise of a parasitic capacitance of the fifth transistor (T5). It is understood throughout this specification that if the ninth voltage (V9) in an example [100] of the composite interface circuit is selected as being substantially higher than the tenth voltage (V10) and if the ninth pull-up resistor [R9] is selected for causing the further bidirectional single-conductor bus [105] to be pulled up to the eleventh voltage (V11) as being substantially higher than the tenth voltage (V10) then the resulting rate of rise of the parasitic capacitance of the fifth transistor (T5) is considered to be substantially increased, in comparison with another example [100] of the composite interface circuit in which the ninth voltage (V9) is selected as not being substantially higher than the tenth voltage (V10) and in which the ninth pull-up resistor [R9] is selected as causing the further bidirectional single-conductor bus [105] to be pulled up to the eleventh voltage (V11) as not being substantially higher than the tenth voltage (V10).

In some examples [100] of the composite interface circuit, the fifth transistor (T5) may have a fifth switching voltage threshold; and the eleventh voltage (V11) of the further bidirectional single-conductor bus [105] may be pulled down to zero volts when a voltage on the third transmitter conductor (Tx3) exceeds the fifth switching voltage threshold.

In further examples [100] of the composite interface circuit, the ninth voltage (V9) may be selected as being substantially higher than the tenth voltage (V10); and the eleventh resistor (R11) and the twelfth resistor (R12) may be selected for causing the ninth voltage (V9) to be sufficiently divided at the fifth node [119] so as to substantially increase a rate of rise of a parasitic capacitance of the sixth transistor (T6) at the fifth node [119]. It is understood throughout this specification that if the ninth voltage (V9) in an example [100] of the composite interface circuit is selected as being substantially higher than the tenth voltage (V10) and if the eleventh resistor (R11) and the twelfth resistor (R12) are selected for causing the ninth voltage (V9) to be reduced by at least about fifty percent (50%) at the fifth node [119] then the resulting rate of rise of the parasitic capacitance of the sixth transistor (T6) is considered to be substantially increased, in comparison with another example [100] of the composite interface circuit in which the ninth voltage (V9) is selected as not being substantially higher than the tenth voltage (V10) and in which the eleventh resistor (R11) and the twelfth resistor (R12) are selected as causing the ninth voltage (V9) to not be reduced by at least about fifty percent (50%) at the fifth node [119].

In some examples [100] of the composite interface circuit, the sixth transistor (T6) may have a sixth switching voltage threshold; and the eleventh voltage (V11) of the further bidirectional single-conductor bus [105] may cause a twelfth voltage (V12) at a sixth node [121] between the sixth transistor (T6) and the tenth pull-up resistor (R10) to be pulled down to zero volts when a voltage at the fifth node [119] exceeds the sixth switching voltage threshold.

In some examples [100] of the composite interface circuit, each among the second voltage (V2) and the sixth voltage (V6) and the tenth voltage (V10) may be independently selected, and the third resistor (R3) and the fourth resistor (R4) may be selected for causing the first voltage (V1) to be sufficiently divided at the first node [110] so as to substantially increase the rate of rise of the parasitic capacitance of the second transistor (T2) at the first node [110], and the seventh resistor (R7) and the eighth resistor (R8) may be selected for causing the fifth voltage (V5) to be sufficiently divided at the third node [118] so as to substantially increase the rate of rise of the parasitic capacitance of the fourth transistor (T4) at the third node [118], and the eleventh resistor (R11) and the twelfth resistor (R12) may be selected for causing the ninth voltage (V9) to be sufficiently divided at the fifth node [119] so as to substantially increase the rate of rise of the parasitic capacitance of the sixth transistor (T6) at the fifth node [119]. As an example [100] of the composite interface circuit, the second voltage (V2) may be selected as being about five volts; and the sixth voltage (V6) may be independently selected as being about two and one-half volts, and the tenth voltage (V10) may be independently selected as being about three and one-third volts. It is understood throughout this specification that the selected voltages in that example [100] of the composite interface circuit are merely examples, and that in the examples [100] of the composite interface circuit, each one among the second voltage (V2) and the sixth voltage (V6) and the tenth voltage (V10) may have other values.

In further examples [100] of the composite interface circuit, the bidirectional single-conductor bus [102] and the another bidirectional single-conductor bus [103] and the further bidirectional single-conductor bus [105] may be coupled together by the conductor [123]. In those further examples [100] of the composite interface circuit, (V1), (V5) and (V9) may be the same, or may be different, with suitable voltage adjustments being provided at their interconnections.

It is to be understood throughout this specification that an example [100] of a composite interface circuit may include the bidirectional single-conductor bus [102] together with the first switching circuit [104] and the second switching circuit [106] as described above, or may include those circuit elements [102], [104] and [106] and additionally include the another bidirectional single-conductor bus [103] together with the third switching circuit [114] and the fourth switching circuit [116] as described above, or may include those circuit elements [102], [104], [106], [103], [114], [116] and additionally include the further bidirectional single-conductor bus [105] together with the fifth switching circuit [115] and the sixth switching circuit [117] as described above, or may include those circuit elements [102], [104], [106], [103], [114], [116], [105], [115], [117] and additionally include one or more further bidirectional single-conductor buses together with one or more further pairs of switching circuits being like the pair [104], [106], or the pair [114], [116], or the pair [115], [117] of the switching circuits.

In additional examples [100] of the composite interface circuit, the fifth transistor (T5) may be a field-effect transistor having a gate [G], a source [S], and a drain [D]; and the gate [G] may be configured for being coupled with a third transmitter conductor (Tx3); and the ninth pull-up resistor [R9] may be coupled between the drain [D] and the fifth DC input current source [CS5]. In some of those examples [100] of the composite interface circuit, the fifth transistor (T5) may be an N-channel enhancement-mode metal-oxide semiconductor field-effect transistor ("MOS-FET") having the gate [G], the source [S], and the drain [D]; and the gate [G] may be configured for being coupled with a third transmitter conductor (Tx3); and the ninth pull-up resistor [R9] may be coupled between the drain [D] and the fifth DC input current source [CS5].

In other examples [100] of the composite interface circuit, the fifth transistor (T5) may be (not shown) a bipolar junction transistor ("BJT") having a base, an emitter, and a collector; and the base may be configured for being coupled with a third transmitter conductor (Tx3); and the ninth pull-up resistor [R9] may be coupled between the collector and the fifth DC input current source [CS5]. Further in those examples [100] of the composite interface circuit, the fifth transistor (T5) may be (not shown) an N-channel bipolar junction transistor ("BJT") having a base, an emitter, and a collector; and the base may be configured for being coupled with a third transmitter conductor (Tx3); and the ninth pull-up resistor [R9] may be coupled between the collector and the fifth DC input current source [CS5].

In some examples [100] of the composite interface circuit, the sixth transistor (T6) may be a bipolar junction transistor ("BJT") having a base [B], an emitter [E], and a collector [C]; and the base [B] may be configured for being coupled with the further voltage divider [113] at the fifth node [119] between the eleventh resistor (R11) and the twelfth resistor (R12); and the tenth pull-up resistor (R10) may be coupled between the collector [C] and the sixth DC input current source [CS6]. Further in those examples [100] of the composite interface circuit, the sixth transistor (T6) may be an N-channel bipolar junction transistor ("BJT") having the base [B], the emitter [E], and the collector [C]; and the base [B] may be configured for being coupled with the further voltage divider [113] at the fifth node [119] between the eleventh resistor (R11) and the twelfth resistor (R12); and the tenth pull-up resistor (R10) may be coupled between the collector [C] and the sixth DC input current source [CS6].

In other examples [100] of the composite interface circuit, the sixth transistor (T6) may be (not shown) a field-effect transistor having a gate, a source, and a drain; and the gate may be configured for being coupled with the further voltage divider [113] at the fifth node [119] between the eleventh resistor (R11) and the twelfth resistor (R12); and the tenth pull-up resistor (R10) may be coupled between the drain and the sixth DC input current source [CS6]. Further in those examples [100] of the composite interface circuit, the sixth transistor (T6) may be (not shown) an N-channel enhancement-mode metal-oxide semiconductor field-effect transistor ("MOSFET") having the gate, the source, and the drain; and the gate may be configured for being coupled with the further voltage divider [113] at the fifth node [119] between the eleventh resistor (R11) and the twelfth resistor (R12); and the tenth pull-up resistor (R10) may be coupled between the drain and the sixth DC input current source [CS6].

In some examples [100] of the composite interface, the further bidirectional single-conductor bus [105] and the fifth switching circuit [115] and the sixth switching circuit [117] may be incorporated into an integrated circuit (not shown). Further in those examples [100] of the composite interface, the integrated circuit (not shown) may be in the form of a microcontroller, an application-specific integrated circuit (ASIC), a digital signal processor (DSP), or a field-programmable gate array (FPGA).

In examples [100], the composite interface circuit may further include a third full duplex universal asynchronous data communication interface (UArt3) having a third receiver conductor (Rx3) and a third transmitter conductor (Tx3), and the fifth switching circuit [115] may be coupled with the third transmitter conductor (Tx3), and the sixth switching circuit [117] may be coupled with the third receiver conductor (Rx3). In some of those examples [100] of the composite interface circuit, the fifth transistor (T5) may be a field-effect transistor having a gate [G], a source [S], and a drain [D]; and the gate [G] may be configured for being coupled with a third transmitter conductor (Tx3). In others of those examples [100] of the composite interface circuit, the fifth transistor (T5) may be (not shown) a bipolar junction transistor ("BJT") having a base, an emitter, and a collector; and the base may be configured for being coupled with a third transmitter conductor (Tx3). In some of those examples [100] of the composite interface circuit, the sixth transistor (T6) may be a bipolar junction transistor ("BJT") having a base [B], an emitter [E], and a collector [C]; and the collector [C] may be configured for being coupled with a third receiver conductor (Rx3). In others of those examples [100] of the composite interface circuit, the sixth transistor (T6) may be (not shown) a field-effect transistor having a gate, a source, and a drain; and the drain may be configured for being coupled with a third receiver conductor (Rx3).

In some of those examples [100] of the composite interface, the third full duplex universal asynchronous data communication interface (UArt3) may be included in a microprocessor (MP) being incorporated in an active device (AD). It is understood throughout this specification that the term "active device" means a circuit component with the ability to electrically control electric charge flow, i.e., an active device is a circuit component with the ability to utilize electricity to control an electric charge flow (electricity controlling electricity). Further in those examples [100] of the composite interface, the third full duplex universal asynchronous data communication interface (UArt3) may be included in a microprocessor (MP) of an active device (AD) being a lighting device (not shown). Additionally in those examples [100] of the composite interface, the third full duplex universal asynchronous data communication interface (UArt3) may exchange bidirectional data communications with the microprocessor (MP) for controlling the active device (AD). Also in those examples [100] of the composite interface, the third full duplex universal asynchronous data communication interface (UArt3) may exchange bidirectional data communications with the microprocessor (MP) for controlling the active device (AD) as being a lighting device (not shown). Further in those examples [100] of the composite interface, the third full duplex universal asynchronous data communication interface (UArt3) may exchange bidirectional data communications with the microprocessor (MP) for controlling a lighting device (not shown) that includes a semiconductor light-emitting device. In others of those examples [100] of the composite interface, the third full duplex universal asynchronous data communication interface (UArt3) may exchange bidirectional data communications with the microprocessor (MP) for controlling the active device as including, as examples, a switched-mode power supply (SMPS), a backup battery power supply, or a controller.

The examples [100] of composite interface circuits may generally be utilized in end-use applications where there is a need for data communications among a plurality of full duplex universal asynchronous data communication interfaces (UArts) each having a receiver conductor (Rx) and a transmitter conductor (Tx). For example, the examples [100] of composite interface circuits may be useful in end-use applications where there is a need for enabling data communications at substantially higher baud rates among a plurality of full duplex universal asynchronous data communication interfaces (UArts). The examples [100] of the composite interface circuits have switching circuits that include transistors being arranged in the composite interface circuits so as to result in increased rates of rise of parasitic capacitance of the transistors. Consequently, the switching circuits may be more rapidly cycled between open and closed (i.e., off and on) states, which facilitates higher baud rates of data communications between a plurality of full duplex universal asynchronous data communication interfaces (UArts).

In addition, the examples [100] of the composite interface circuit may facilitate data communications among a plurality of full duplex universal asynchronous data communication interfaces (UArts) each having a receiver conductor (Rx) and a transmitter conductor (Tx), in which some or all of the plurality of the full duplex universal asynchronous data communication interfaces (UArts) may have different operating voltages.

While the present invention has been disclosed in a presently defined context, it will be recognized that the present teachings may be adapted to a variety of contexts consistent with this disclosure and the claims that follow. For example, the composite interface circuits shown in the FIGURE and discussed above can be adapted in the spirit of the many optional parameters shown and described.

We claim:

1. A composite interface circuit comprising a bidirectional single-conductor bus, for coupling together (a) a first full duplex universal asynchronous data communication interface (UArt1) having a first operating voltage, the UArt1 including a first receiver conductor (Rx1) and a first transmitter conductor (Tx1) and (b) a second full duplex universal asynchronous data communication interface (Uart2) having a second operating voltage being independent of the first operating voltage, the UArt2 including a second receiver conductor (Rx2) and a second transmitter conductor (Tx2), the composite interface circuit including:

the bidirectional single-conductor bus being coupled by a first pull-up resistor (R1) with a first direct current ("DC") input current source having a first voltage (V1);

a first switching circuit including a first transistor (T1), the first transistor (T1) being coupled with the first pull-up resistor (R1) and with the bidirectional single-conductor bus;

a second switching circuit including a second transistor (T2), the second transistor (T2) being coupled by a second pull-up resistor (R2) with a second DC input current source having a second voltage (V2) being the first operating voltage of the UArt1, the second switching circuit further including a voltage divider coupling the second transistor (T2) with the bidirectional single-conductor bus;

wherein the first switching circuit is configured for being coupled with a first transmitter conductor (Tx1) of the UArt1; and wherein the second switching circuit is configured for being coupled with a first receiver conductor (Rx1) of the UArt1.

2. The composite interface circuit of claim 1, wherein the voltage divider includes a third resistor (R3) and a fourth resistor (R4), and wherein the third resistor (R3) is coupled between the fourth resistor (R4) and the bidirectional single-conductor bus, and wherein the second transistor (T2) is coupled with the voltage divider at a first node between the third resistor (R3) and the fourth resistor (R4).

3. The composite interface circuit of claim 2, wherein the voltage divider includes the third resistor (R3) and the fourth resistor (R4) as being selected for reducing the first voltage (V1), at the first node, below a breakdown voltage of the second transistor (T2).

4. The composite interface circuit of claim 1, wherein the first voltage (V1) is substantially higher than the second voltage (V2).

5. The composite interface circuit of claim 1, wherein the first voltage (V1) is at least about one order of magnitude higher than the second voltage (V2).

6. The composite interface circuit of claim 1, wherein the first voltage (V1) is selected as being substantially higher than the second voltage (V2), and wherein the first pull-up resistor (R1) is selected for causing the bidirectional single-conductor bus to be pulled up to a third voltage (V3) being substantially higher than the second voltage (V2) so as to substantially increase a rate of rise of a parasitic capacitance of the first transistor (T1).

7. The composite interface circuit of claim 6, wherein the first transistor (T1) has a first switching voltage threshold; and wherein the third voltage (V3) of the bidirectional single-conductor bus is pulled down to zero volts when a voltage on the first transmitter conductor (Tx1) exceeds the first switching voltage threshold.

8. The composite interface circuit of claim 2, wherein the first voltage (V1) is selected as being substantially higher than the second voltage (V2), and wherein the third resistor (R3) and the fourth resistor (R4) are selected for causing the first voltage (V1) to be sufficiently divided at the first node so as to substantially increase a rate of rise of a parasitic capacitance of the second transistor (T2) at the first node.

9. The composite interface circuit of claim 8, wherein the second transistor (T2) has a second switching voltage threshold; and wherein the third voltage (V3) of the bidirectional single-conductor bus causes a fourth voltage (V4) at a second node between the second transistor (T2) and the second resistor (R2) to be pulled down to zero volts when a voltage at the first node exceeds the second switching voltage threshold.

10. The composite interface circuit of claim 1, further including the first full duplex universal asynchronous data communication interface (UArt1) having the first operating voltage, and including a first receiver conductor (Rx1) and a first transmitter conductor (Tx1), wherein the first switching circuit is coupled with the first transmitter conductor (Tx1), and wherein the second switching circuit is coupled with the first receiver conductor (Rx1).

11. The composite interface circuit of claim 1, further including:
another bidirectional single-conductor bus, being coupled by
a fifth pull-up resistor (R5) with a third direct current ("DC") input current source having a fifth voltage (V5);
a third switching circuit including a third transistor (T3), the third transistor (T3) being coupled with the fifth pull-up resistor (R5) and with the another bidirectional single-conductor bus;
a fourth switching circuit including a fourth transistor (T4), the fourth transistor (T4) being coupled by a sixth pull-up resistor (R6) with a fourth DC input current source having a sixth voltage (V6) being the second operating voltage of the UArt2, the fourth switching circuit further including another voltage divider coupling the fourth transistor (T4) with the another bidirectional single-conductor bus;

wherein the third switching circuit is configured for being coupled with a second transmitter conductor (Tx2) of the UArt2; and
wherein the fourth switching circuit is configured for being coupled with a second receiver conductor (Rx2) of the UART2.

12. The composite interface circuit of claim 11, wherein the another voltage divider includes a seventh resistor (R7) and an eighth resistor (R8), and wherein the seventh resistor (R7) is coupled between the eighth resistor (R8) and the another bidirectional single-conductor bus, and wherein the fourth transistor (T4) is coupled with the another voltage divider at a third node between the seventh resistor (R7) and the eighth resistor (R8).

13. The composite interface circuit of claim 12, wherein the another voltage divider includes the seventh resistor (R7) and the eighth resistor (R8) as being selected for reducing the fifth voltage (V5), at the third node, below a breakdown voltage of the fourth transistor (T4).

14. The composite interface circuit of claim 11, wherein the fifth voltage (V5) is substantially higher than the sixth voltage (V6).

15. The composite interface circuit of claim 11, wherein the fifth voltage (V5) is at least about one order of magnitude higher than the sixth voltage (V6).

16. The composite interface circuit of claim 11, wherein the fifth voltage (V5) is selected as being substantially higher than the sixth voltage (V6), and wherein the fifth pull-up resistor (R5) is selected for causing the another bidirectional single-conductor bus to be pulled up to a seventh voltage (V7) being substantially higher than the sixth voltage (V6) so as to substantially increase a rate of rise of a parasitic capacitance of the third transistor (T3).

17. The composite interface circuit of claim 16, wherein the third transistor (T3) has a third switching voltage threshold; and wherein the seventh voltage (V7) of the another bidirectional single-conductor bus is pulled down to zero volts when a voltage on the second transmitter conductor (Tx2) exceeds the third switching voltage threshold.

18. The composite interface circuit of claim 12, wherein the fifth voltage (V5) is selected as being substantially higher than the sixth voltage (V6), and wherein the seventh resistor (R7) and the eighth resistor (R8) are selected for causing the fifth voltage (V5) to be sufficiently divided at the third node so as to substantially increase a rate of rise of a parasitic capacitance of the fourth transistor (T4) at the third node.

19. The composite interface circuit of claim 18, wherein the fourth transistor (T4) has a fourth switching voltage threshold; and wherein the seventh voltage (V7) of the another bidirectional single-conductor bus causes an eighth voltage (V8) at a fourth node between the fourth transistor (T4) and the second resistor (R2) to be pulled down to zero volts when a voltage at the third node exceeds the fourth switching voltage threshold.

20. The composite interface circuit of claim 11, further including the second full duplex universal asynchronous data communication interface (UArt2) having the second operating voltage, and including a second receiver conductor (Rx2) and a second transmitter conductor (Tx2), wherein the third switching circuit is coupled with the second transmitter conductor (Tx2), and wherein the fourth switching circuit is coupled with the second receiver conductor (Rx2).

* * * * *